United States Patent [19]
Randazzo

[11] 3,936,423
[45] Feb. 3, 1976

[54] PROCESS FOR THE PREPARATION OF POLYALDEHYDES BY POLYMERIZATION OF BIFUNCTIONAL MONOMERS AND RELATED PRODUCTS

[76] Inventor: Giacomino Randazzo, No. 125F/, Via San Giacomo dei Capri, Naples, Italy

[22] Filed: May 3, 1974

[21] Appl. No.: 466,853

[30] Foreign Application Priority Data
May 30, 1973 Italy.................................. 50353/73

[52] U.S. Cl................. 260/67 UA; 210/59; 210/64; 210/DIG. 15; 424/65; 424/82
[51] Int. Cl.² .................... C08F 116/34; C02C 1/40
[58] Field of Search .............................. 260/67 UA

[56] References Cited
UNITED STATES PATENTS

| | | | |
|---|---|---|---|
| 3,089,861 | 5/1963 | Leyerzapf ...................... | 260/67 UA |
| 3,142,661 | 7/1964 | Brendlein et al............... | 260/67 UA |
| 3,405,095 | 10/1968 | Hartel et al..................... | 260/67 UA |

Primary Examiner—Lucille M. Phynes
Attorney, Agent, or Firm—Young & Thompson

[57] ABSTRACT

Process for the preparation of polyaldehydes by polymerization with a redox system, of bifunctional monomers having the general formula:

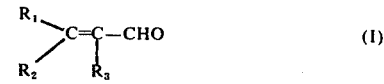

(I)

wherein $R_1 = R_2 = $ H and $R_3$ is —H, —$CH_3$, —$C_2H_5$, —$C_3H_7$, —$C_6H_{13}$, or —$C_6H_5$ or $R_1 = R_3 = $ H and $R_2$ is —$CH_3$, —$C_6H_5$, or —$CH_3$ —CH = CH, performing the polymerization under stirring, in absence of light and in an oxygen free nitrogen atmosphere, for a period of 2–20 hours, at a temperature ranging from 0° to 40°C, using degassed and double distilled water as a solvent and $K_2S_2O_8/AgNO_3$ as a redox system, adding degassed and double distilled water to the polymerized mass, collecting the polyaldehyde by filtration and centrifugation, washing several times with water, then with 0.1 N $HNO_3$, again washing with water and finally with acetone and drying the product.

8 Claims, No Drawings

PROCESS FOR THE PREPARATION OF POLYALDEHYDES BY POLYMERIZATION OF BIFUNCTIONAL MONOMERS AND RELATED PRODUCTS

The object of the present invention is a process for the preparation of polyaldehydes by polymerization of bifunctional monomers and related products. The invention concerns in particular a process for the preparation of a well defined series of aldehydes, with a content of aldehydic groups presenting a marked tendency for reacting with the catabolic substances which usually accumulate in individuals affected by renal or hepatic insufficiensy, and electively with methylguanidine.

The polyaldehydic substances of the present invention, display, therefore, a great efficiency in the cure of diseases of the above mentioned type and for uses derived from their great reactivity of the molecule, such as, for example, deodorants, smokes and water cleansers, etc.

It is known, in fact, that nephropathy and uremia cause an intense metabolic modification of nitrogen metabolism in man. More precisely, in patients affected by renal insufficiency, an increase of hematic nitrogen and hematinuria is observed. Very recently it has been observed that the nitrogen catabolite most important as toxic element present in such patients is methylguanidine

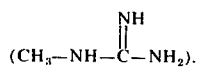

It has been demonstrated (S. Giovannetti et al.), Clin. Sci. 36, 445, (1969); Experentia 24, 341, (1968); Experentia 27, 1157 (1971), that the most serious symptoms of uremic poisoning should be ascribed to this catabolite.

Other catabolites present in an altered concentration in the uremic patient are urea, ammonia (hepatic insufficiency), creatinine, guanidine. It is also possible to detect in the uremic patient the presence of a series of other substances such as the polyamines (cadaverine, putrescine, etc.) and others (for example methylamine, ethylamine, allylamine, piperidine etc.) originating from the intestinal bacterial flora when the concentration of the nitrogenous non-proteic substances that the liver or the kidneys are unable to filter is high. All these substances, some of which are still to be investigated, belong to the group of the so called "uremic toxins". Said toxins are found in the saliva, in the gastro-intestinal tract, in the blood, in the feces of uremic patients. They react with aldehydic groups to form Schiff bases and adducts of the type of methylol derivatives.

In order to reduce the daily production of these toxins and to eliminate their excessive accumulation in the organism it has been proposed to resort to a neither absorbable nor asimilable polyaldehyde that will function as an absorbant of such toxic nitrogenous substances. This absorption may initiate in the saliva by using preparations (for example such polyaldehydes based tablettes), continue in the gastro intestinal tract and then said polyaldehydes are eliminated with the feces after having "linked" said toxins.

Some processes for the preparation of said polyaldehydes by particular polymerization techniques are already known for some time. In fact Redtenbacher observed spontaneous polymerization of acrolein (Ann. 47, 121, (1843), see also U.S. Pat. No. 2,558,520 (U.S. Ind. Chemicals), but the polymers obtained have been not characterized and, in any event, they appeared to have effected polymerization both on the aldehydic and the vinyl group. Subsequently other searchers (R. C. Schulz and W. Passman; Makromol; Chem., 60, 139, (1963); see also: PB 70309; PB 20543 t; Angew, Chem. 62, 105, (1950) and patents mentioned in this publication; German Patent 1062012 (1953), inventor O. Schweitzer; German Pat. Nos. 733099 (1938); 737125 (1939); 745422 (1939); 748690 (1938), inventor F. Köhler; U.S. Pat. No. 2809185, inventors G. W. Hearne, D.S. LaFrance and E. C. Shokal; U.S. Pat. No. 2819252 inventor E. C. Shokal; French Patent No. 1138853 (1955) have determined that 70% of the monomer present in the polyacrolein obtained with sodium naphthalene or sodium trityl or in presence of buffers, is linked by the aldehydic group. Similar results are obtained with a cationic polymerization (R. C. Schulz, Kunststoffe 47, 303 (1957)). Results analogous to the previous ones are obtained by Y. Nagai and T. Nagajima, Kogyo Kagaku Zasshi, 66, 1905 (1963) by way of both anionic and cationic polymerization of α-methylacrolein.

The polymerization of acrolein and of α-methylacrolein by way of radicals have been investigated by I.V. Andrev and collaborators, which results have been communicated at the International Macromolecular Symposium, Prague, 1965, Preprint P 140. These authors did conclude, (in agreement also with E. L. Kropa U.S. Pat. No. 2356767; Misano Akira et al. Yukagakuy 17, 449 (1968); I.V. Andreev et al., Khim. Atsetilena, 386 (1968); Y. Toi and Y. Hachihama, Journ. Chem. Soc. Japan, Ind. Chem. Sect., 62, 1924, (1959); Bull. Chem. Soc. Japan 37, 307 (1964), and U.S. Patent 2657192 (1951) authors H.C. Miller, H.S. Rothrock), that also in this case a polymerization prevalently on the aldehydic group has been obtained. Besides, mixed polymers have been described both by H. Soube as well as by Y. Saito; Kogyo Kagaku, Zasshi 65, 1930 (1962), which have obtained then by cationic polymerization of crotonic aldehyde, and by J.N. Koral, Makromol. Chem., 62, 148 (1963); J. Polymer Sci. 61, 537, (1962); which obtained them by anionic polymerization of the same monomer. Finally crotonic aldehyde has been polymerized with anionic catalysts to polyacetals by V.V. Amerik, B.A. Krentsel, M.V. Shishkina; Vysokomolekul. Soedin., 7 1713, (1965).

Also, a polyacetal of the α-methylacrolein has been described by C.C. Allen, U.S. Pat. No. 2,212,894 (Shell). In addition, a broad study has been made on the possibility of polymerizing the monomers mentioned, with redox catalyst. Several redox couples have been investigated by R.C. Sculz and collaborators (Makromolekul Chem., 24, 141 (1957); 32, 197, (1959); 18/19, 4 (1956); Kunststoffe Plastics 6, 32 (1959), Angew. Chem. 72, 771 (1960); Kolloid Z., 182, 99 (1962). They obtain a polymer having at the most 75.8% of aldehydic groups. An attempt to electrochemical polymerization (R.C. Schulz and W. Strobel, Monatsh. Chem., 99, 1742 (1968), yielded the same unsatisfactory result of anionic polymerization. The great amount of work made on these polymers is not rewarded by the results obtained for the application of the same in the plastic materials and textiles field, as shown by R. Frey, Rév. Gén. Mat. Plastiques, 11, 13, 47, 80 (1965); C. Ellis Chemistry of Synthetic Resins, Reinhold (1965).

A further attempt in this direction has been made, even though in an entirely preliminary and incomplete way in an application for a U.S. Pat. (U.S. patent application Ser. No. 104,514 on Jan. 6, 1971 now U.S. Pat. No. 3,823,233 granted July 9, 1974) of which the Applicant of this patent is a co-author. In this application it is suggested, in fact, of eliminating only urea and ammonia. However it should be observed now that urea is not toxic, not even for the uremic patient (see among others S. Giovannetti et al., Minerva Nefrologica, 17, 60, (1970)), and ammonia derived from bacterial transformation of urea is transformed again in the liver into urea, and therefore in the case of uremia, the preparation, which is the object of the present invention, does not show a great interest. It ¯a certain interest, however only a theoretical one, in the event of hepatic insufficiency, but even then the value of practical application is negligible as it will be explained in the following. It should be pointed out that neither methylguanidine nor the "uremic toxins" are mentioned in the above indicated way. The products described are partially oxidized polysaccharides. Secondly they are not characterized in any way because the molecular weight is not known, their specific qualities are not described (their content in $SO_4^-$, $IO_3^+$, $IO_4^-$, $H^+$, $Na^+$, $H_2O$, $COO^-$, acetone, HCHO, this last being a very toxic substance produced during the reaction). Besides said substances show a great instability as they are easily subjected to oxidation and become very toxic. Moreover the presence of the aldehydic group in a $\beta$-position with respect to the O-acetal linkage, facilitates possible and feasible beta-eliminations which lead to the formation of small fragments of structures of unknown toxicity which, being absorbable, may cause serious damage and do not warrant a safe administration in vivo. This is confirmed by R.E. Sparks et al. (R.E. Sparks et al.; Trans. Amer. Artif. Int. Organs 18, 458 (1972), which observes a depolymerization of the oxystarch when this compound is in presence of buffer solutions at physiologic pH, or in presence of urea and ammonia.

These drawbacks make difficult the application of the oxystarch and in general of the partially oxidized polysaccharides for the mentioned objects.

On the contrary, as it will be said in more detail in the following, the polyaldehydes produced by the process of the present invention, are very stable chemically and they have a remarkably greater effectiveness in the subtractive activity for the uremic toxins.

Finally R.E. Sparks in the same above mentioned publication points to polyacrolein as a possible substitute for oxystarch. However, this indication is rather indefinite, both as far as the preparation and the utilization of the product are concerned.

The few data supplied lead to the assumption that the object of Spark's experiments is a polyacrolein very different from that proposed by the present invention.

In fact it is specified that the polyacrolein polymer has to be encapsulated to allow its administration per os, a fact that justifies the hypothesis that in the polymer there should be present a great number of acetal linkages which, upon hydrolysis in the stomach, will produce toxic molecular fragments. This hypothesis is confirmed by the fact that no specification is given about the total content of the aldehydic groups. Besides, the chemical data supplied by Sparks are very inaccurate; in particular the formulas given for the acrolein polymers are not exact (see page 460 of said publication) and there do not appear in them ether linkages but acetal linkages. This is in sharp contrast with the polyacrolein obtained by the process of the present invention which has the formula:

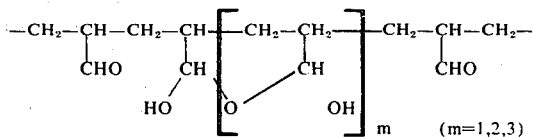

its structure in solution being not different from that in the solid state, with the only difference that the acetal linkages may break down the most in acidic surroundings, as it is possible to show with model compounds such as the diglutaric aldehyde.

It should be observed then, that as far as ammonia is concerned, the reactivity of polyacrolein of the present invention is 47% that is much more above of the 9% reactivity observed by Sparks in the same experimental conditions. And furthermore, the kinetic data relative to said reaction indicate that the product of the present invention will reach 80% of the maximum reactivity after only two hours, whereas in the same conditions of concentration and pH the polyacrolein suggested by Sparks requires several days.

Another characteristic of the polyacrolein known today through the work of Sparks is the polymer maximum solubility in sodium bisulfite solutions which already reaches the maximum for a 20% concentration of polyaldehyde, while the product of the present invention reaches a maximum solubility only for a 40% concentration at room temperature. This comparison allows to define the polyaldehyde obtained by Sparks as polymers with low content of aldehydic groups, which therefore, do not differ anything from the analog our products already described in the prior technique. In fact the hereinabove mentioned data relative to the maximum solubility are directly dependent on the number of aldehydic groups present in the polymer, being precisely these groups that in presence of sodium bisulfite determine the solubility. Another indication supplied by Sparks for his polyacrolein is the activation by means of the formation of the Bertagnini salt (polyacrolein + $NaHSO_3$) which however prevents its utilization in vivo, because the polyacrolein threated in this way is easily oxidable and therefore toxic (see R.C. Schulz, 1 Löflung W. Kern, Makr. Chemie 32, 209, (1959) and evolves $SO_2$ or its equivalents when in solution, if it is reacted with nitrogenous substances, with consequent risks if administrated in vivo.

Further attempts of Sparks to increase the reactivity by forming a polyacrolein gel are not justified because it is well known that (J. Kalac, F. Svec, Coll. Cz. Chem. Comm. 36, 3947 (1971)) the polyaldehydes when gelled bring about an intermolecular polymerization of the aldehydic groups which, therefore, would be no more available to react with urea and ammonia as the author himself could ascertain.

It should be clearly emphasized here that these two catabolites (urea and ammonia) are the only toxic agents on which previous experiments have been directed, including the more recent experiments of Sparks. On the contrary the most ignificant clinical indication for the polyacrolein of the present invention is that one directed to the elimination of methylguanidine besides of the elimination of guanidine, creatinine and of the other mentioned "uremic toxins". As to the preparation method of said polyacrolein, Sparks indicates in an entirely general way a "free radical polymerization" which, as it is well known, is a rather broad term that includes polymerization systems with: (a) peroxides; (b) azocompounds; (c) redoxy systems; and (d) action of the light, etc. (see, for example, Kh S. Bagdasazijan "Theory of free radical polymerization", 1968 Israel program for scientific translation). Now, according to the present invention it is indeed indicated a polymerization process by a redox system, but said system, unlike Sparks system, is exactly defined and leads to the formation of a polyacrolein with different physical constants and therefore with different structures (see also R.C. Schulz, Makr. Chem. 17, 62, (1965)). The diversity of the polyacrolein obtained according to the present invention is, besides, more clearly indicated by the evaluation of the number of aldehydic groups present therein, which is much greater than that one described in the literature. It should be observed, then, that this increment from 75 to 90% of the aldehydic groups, which permits, as said, a safe oral administration of the product, has been ascertained with the same method of determination (Schulz et al., Makr. Chem. 20, 161 (1956)) applied by the other former searchers, who found values not greater than 75%. And even though some authors indicated greater contents (> 95%) of aldehydic groups in polyacroleins, it should be observed however that the determination method is not indicated and therefore such a content cannot be reasonably trusted because, as it is well known, (see what has been described by T.L. Dawson and F.G. Welch, J.A.C.S. 86, 4791 (1964)) the same sample of polyaldehyde gives values for the aldehydic group content which are very different and in disagreement among them, depending on the method used for their determination.

On the contrary it is a positive and demonstrated fact that the process of the present invention leads to the production of polyaldehydes with an aldehydic groups content, actually increased with respect to the values hitherto known and scientifically found. This statement is, moreover, supported by the following data:

the I.R. examination of the substances with a Beckman IR-9 apparatus on a preparation made on KBr, which shows a band at 1720 cm$^{-1}$, due to the aldehydic groups much more intense than the band at 1653 cm$^{-1}$;

exactly the opposite occurs for the polyacrolein with 65% of aldehydic group prepared by Schulz (Makr. Chem. 17, 62 (1965)), where the presence of acetalic linkages has been ascertained (Von Rudolph Hank, Makr. Chem., 52, 108 (1962));

exclusion of the presence of acetal linkages after acid washing and determination of the residue at 110°C and of the sulfuric ashes content in the residue. It is known, in fact, that acetals and polyacetals are completely hydrolyzed after 90 minutes at pH 1.

It is now evident the importance of the polyaldehydic products of the present invention, which besides eliminating the drawbacks of the analogous compounds of the prior technique, can also be utilized as integrators of the dialytic treatment, which does not act on those uremic toxins and in particular on methylguanidine (P.C. Farrel et al., Trans. Amer. Soc. Artif. Int. Organs, 18, 268 (1972), while the product of the present invention is instead electively designed for the absorption and elimination of these toxins. In addition it should be observed that when the polyaldehydic resin of the present invention comes into contact with physiologic liquids, it swells about four times its volume by absorbing water, the elimination of which from the organism constitutes always a further serious problem for the uremic patients.

The invention, as hereinbefore indicated, offers and carries into effect a process for the production of polyaldehydes improved in their absorption effect on the uremic toxins, orally administrable without risks, in which process are included some operative steps, in particular the step of washing with 0.1 and/or 0.01 N HNO$_3$ which permits to eliminate by hydrolysis eventual acetal linkages, the use of which in the sequence and in the conditions indicated is characteristically new as compared to the techniques hitherto known in this field.

Therefore the invention offers a process for the preparation of polyaldehydes by polymerization with a redox system, of bifunctional monomers having the general formula

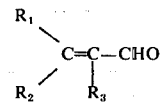

in which $R_1 = R_2 = H$ and $R_3$ is $-H$, $-CH_3$, $-C_2H_5$, $-C_3H_7$, $-C_6H_{13}$, or $-C_6H_5$ or $R_1 = R_3 = H$ $R_2$ is $-CH_3$, $C_6H_5-$, or $CH_3-CH=CH-$ characterized by the fact of performing the polymerization under stirring in the absence of light and in a oxygen free (O2< 10$^{-4}$ ppm) nitrogen atmosphere, for a period of 2–20 hours, at a temperature of 0°–40°C using degassed and double distilled water as a solvent and a $K_2S_2O_8/AgNO_3$ redox system, adding water to the polymerized mass, recovering the polyaldehyde by filtration or centrifugation, washing several times with water and then with 0.1 N and/or 0.01 N HNO$_3$, then again with water, finally with acetone and then drying the product.

It should be observed in particular, that in order to ensure a reasonable reproducibility in standard conditions, the monomer is directly redistilled in absence of light in the reaction container, until a quantity of monomer equal to 1 part is obtained (for example 200 – 5,000 cc).

Then 5 parts of a potassium persulfate 5–100 mM solution in degassed water are added. After the monomer has been dissolved, 0.6 parts of AgNO$_3$ 5–100 mM solution are slowly added in 10 minutes, maintaining the whole reaction system at a temperature ranging from 0° to 40°C under nitrogen and in absence of light. After 2 hours, 5 parts of water are added and the polymer recovered by filtration or centrifugation is washed 5 times with 3 parts of water and then with 0.1 N HNO$_3$, then again with water until neutrality and thereafter 3 times with one part of acetone and kept in the oven at 30°C.

The bifunctional monomers of formula (I), which are preferably used in the process of the present invention are acrolein, alphamethyl-acrolein, alpha-ethyl-acrolein, alpha-isopropyl-acrolein, alphahexyl-acrolein, alpha-phenyl-acrolein, crotonic aldehyde, cinnamic aldehyde, sorbic aldehyde etc. Furfural (2, furanic aldehyde) and allylidene diacetate may also be used with good results. The yield of the reaction may range from 62 to 86%.

It should be emphasized that the most remarkable results have been obtained with the application of the present invention process of polymerization to acrolein. The technique performed and in particular the washing step ($H_2O$; $HNO_3$ 0.1 N; $H_2O$) subsequent to the recovery of the centrifuged or filtrated product, is one of the most distinctive and outstanding features of the present invention, and leads, as mentioned herein both to the complete removal of the $Ag^+$ traces (catalyst) as well as to the hydrolysis of eventual acetal linkages. Besides acetal polymerization is reduced to a minimum because:

a. the operation is carried out in the dark and under oxygen free nitrogen (obtained by passing it into $Cr^{++}$);

b. the monomer is destabilized under these conditions, by distillation in a Vigreux column and is recovered in the absence of light and under nitrogen.

A further acid washing ($HNO_3$ 0.01 N) allows, in addition, the elimination of the sulfuric ashes and the reduction of the residue of the acid washing at 110°C as it will be illustrated hereinafter.

Thus polyaldehydic products with molecular weight ranging from 5,000 to 1,000,000, preferably 20,000 – 30,000 are obtained. The quantity of necessary catalyst in the case of redistilled acrolein was, for example, 7.75 (or 9.50) grams of $K_2S_2O_8$ and 2.96 (or 5.92) grams of $AgNO_3$ per 100 cc of said acrolein.

The products obtained according to the present invention process have been completely characterized by means of physical and chemical methods. They are white, amorphous, hygroscopic solids which at the temperature of 190°–220°C and in presence of air take a brown-yellow color, without softening; when suspended in water they show a slightly acid pH (pH 3–4); they are soluble in many organic solvents, with the exception of polyacrolein which is insoluble.

The ultimate analysis, for example in the case of polyacrolein, after drying on $P_2H_5$ and in high vacuum has indicated for $(C_3H_4O)_n$

| | | |
|---|---|---|
| Calculated | C 64.27% | H 7.19% |
| Found | 61.2–61.8% | 7.4–8.0% | the found percentage will agree with the theoretical percentage if a content of 7% of water, as determined by the Karl Fisher method is taken into account. The IR spectrum shows characteristic bands at 2.9 $\mu$ (OH), 3.65 $\mu$ (aldehydic C$\underline{H}$), 5.85 $\mu$ (aldehydic C = O), 6.1 $\mu$ ($H_2O$), and broadened bands at 8.5 – 11 $\mu$ (C—O—C) and 12 – 12.3 $\mu$ (pyranic ring). The IR spectrum and the ultimate analysis provide some good indications on the macromolecule structure. In fact two aldehydic groups in the hydrated form may form a hemiacetalic linkage yielding a pyranic ring. Confirmation of that, besides being obtained by IR, is also obtained by nuclear magnetic resonance measurements on a model compound such as diglutaric aldehyde. The NMR registered in acqueous solution shows a triplet a 2.4 $\delta$, relative to the protons in $\alpha$ of the pyranic form, and a singlet due to C$\underline{H}$O at 9.5$\delta$. The triplet disappears by acidification with a drop of conc. HCl. This means that the aldehydic and pyranic forms are in equilibrium in solution, and that said equilibrium depends on the pH. The ratio of the two forms is respectively 1:3 as can be obtained by integration of the relative peaks. The molecular weight of the polymers obtained according to the present invention has been determined by viscosity measurements with a Hubbelohde viscosimeter after the polymer has been solubilized in a 10% sodium metabisulfite solution. The polymers described in the present invention show a very high reactivity and it is surprising that notwithstanding that they can be kept indefinitely at room temperature and in air without undergoing an alteration. Besides they are stable up to 100°C in an oxygen atmosphere.

They reduce the liquid of Fehling and the liquid of Tollens and they give all the chromatic characteristic reactions of the aldehydes. They yield oximes with hydroxylamine. The last reaction is interesting for the quantitative determination of the aldehydic groups, which in the polymer described reach up to 90%.

As far as polyacrolein is concerned it has been characterized by IR spectroscopy and by ultimate analysis of C, H, and N performed on its hydroxylamine derivative. The results reported in the following Example 1, are in complete agreement with the theoretical values.

EXAMPLE I (polyacrolein oxime — IR Spectrum — Ultimate analysis)

800 mg of polyacrolein have been suspended into 40 cc of a 3.5% hydroxylamine hydrochloride water and alcohol solution (160 cc $H_2O$ – 840 cc 95% ethanol); 120 cc of an alcoholic solution of pyridine (20 cc of pyridine to 1000 cc with 95% ethanol) have been added to the suspension and the mixture has been stirred for 62 hours at room temperature.

The precipitate has been collected, washed abundantly with water and then with ethanol and ether; subsequently it has been dried 3 hours at 60°C under high vacuum. The I.R. spectrum of the powder thus obtained shows, among the others, the characteristic band of the oxime at 1330 $cm^{-1}$. The water content was 5.26% and the ultimate analysis, in agreement with the theoretical data for the formula $(C_3H_5ON)_n$ is:

| | |
|---|---|
| C% | 50.00 |
| H% | 7.07 |
| N% | 17.11 |

As far as the water content of several polyacrolein preparations according to the present invention is concerned, it varies in the range from 7.3 to 32.6%. The determination of the sulfuric ashes for the same preparations was about 0.25% while the heavy metals content is less than 10 ppm. The residue of the acid washing at 110°C was 0.4% and the sulfuric ashes content on the residue of the acid washing was 0.05%. A further acid washing ($HNO_3$ 0.01 N) brings the residue of the acid washing down to 0.1% and completely eliminates the sulfuric ashes. The titrable acidity is 0.03 meq/g. The $NO_3^-$ content is 0.02%. A colorimetric test with chromotropic acid and with 2,4-dinitrophenylhydrazine indicated a free aldehydes content of respectively 0.001% and 0.07%. Some examples of tests which emphasize the property of polyacrolein of subtracting urea, ammonia, methylguanidine and creatinine from solutions of a known concentration at different pH values are reported.

EXAMPLE II

A. Substraction of urea from urea solutions of variable concentration at pH = 1

The amount in grams of urea subtracted is referred to 100 g of polyacrolein of the present invention. In particular the following results have been obtained

| Urea concentration % | Urea (g) subtracted by 100 g of polyacrolein |
|---|---|
| 0.3 | 2.7 |
| 0.6 | 4.9 |
| 1.2 | 8.3 |
| 2.4 | 14.2 |
| 6 | 24 |
| 12 | 34 |

From what has been said it apperas that the herein mentioned polyacrolein is able to link urea up to 34 g of urea per 100 g of product.

B. Subtraction of urea from urea solutions of variable concentration at physiologic pH.

The following results have been obtained for urea solution at pH = 7.4

| Urea concentration % | Urea (g) subtracted by 100 g of polyacrolein |
|---|---|
| 0.3 | 0.34 |
| 1 | 0.90 |
| 3 | 3.40 |
| 10 | 10.00 |

It should be observed that also at physiologic pH (pH = 7.4) the ability of polyacrolein of fixing urea is still particularly remarkable.

C. Subtraction of urea from urea solutions of concentration variable within physiologic limits at pH = 6.6

The results obtained with four urea solutions at the herein below indicated concentrations are reported.

| UREA Initial Conc. | UREA final conc. | % Decrement in urea conc. (D%) |
|---|---|---|
| 0.05 | 0.042 | 16 |
| 0.10 | 0.087 | 13 |
| 0.20 | 0.172 | 11 |
| 0.40 | 0.364 | 9 |

In particular, percent decrements (D%) of urea content ranging from 9 to 16% have been observed.

EXAMPLE III

The reactivity of polyacrolein with ammonia has been evaluated (D) at pH = 6.6 by measuring the percent decrement (D%) of solutions with varying ammonia concentrations or (E) by varying the polyacrolein amonut/volume of the solution ratio, or also (F) by keeping constant both the ammonia concentration and the polyacrolein amount/volume of the solution ratio and varying the resin-solution contact time. The results are reported in the following tables D, E and F.

TABLE D

| Test | Q | R | C initial | C final | D% |
|---|---|---|---|---|---|
| A | 6.25 | 1/160 | 0.001 | 0.00873 | 12.7 |
| B | 12.5 | 1/80 | 0.001 | 0.00773 | 22.7 |
| C | 25 | 1/40 | 0.001 | 0.00712 | 28.8 |
| D | 50 | 1/20 | 0.001 | 0.00592 | 40.8 |
| E | 100 | 1/10 | 0.001 | 0.00475 | 52.5 |

Q - Amount of polyacrolein in g suspended in 1 l of solution.
R - Polyacrolein amount/volume of solution ratio (g/ml).
C initial - Initial concentration of ammonium ion expressed as ammonia %.
C final - Final ammonia concentration %;
D% - Percent decrement of the concentration.

TABLE E

| Test | C initial | C final | D% |
|---|---|---|---|
| 1 | 0 | 0 | 0 |
| 2 | 0.0001 | 0.0000292 | 70.8 |
| 3 | 0.001 | 0.000472 | 52.8 |
| 4 | 0.01 | 0.007 | 30 |
| 5 | 0.1 | 0.0845 | 15.5 |

C initial - Initial ammonia concentration %
C final - Final ammonia concentration %.
D% - Percent decrement of the concentration

TABLE F

| Test | Time in h | Initial Conc. | D% |
|---|---|---|---|
| 1 | 2 | 0.001 | 30.9 |
| 2 | 4 | 0.001 | 37 |
| 3 | 8 | 0.001 | 40 |
| 4 | 16 | 0.001 | 48 |
| 5 | 24 | 0.001 | 48.6 |

It should be specified herein that for the urea determination the P.J. Geiger method has been applied (P.J. Geiger, Microchemica J., 13 481 (1968); Anal. Abs., 18, 421 (1970)); for the ammonia the Hafman method has been used (Hafman, 2 Med. Labortech., 10, 86–89 (1969); Anal. Abs., 19 440 (1970)).

From the results reported in these tables it can be observed that D% increases with the increase of the polyacrolein amount/volume of the solution ratio. The maximum observed decrement (E) 79.8% provides a measure of the strong affinity of polyacrolein for ammonia. Finally (F) it can be observed that hardly after two hours a 30.9% D% is obtained to arrive, after 24 hours at a maximum of 48.6%, a fact which indicates a polyacrolein reactivity for ammonia of 62% already after only two hours as compared to the total reactivity.

EXAMPLE IV (Reactivity tests on methylguanidine)

Two tests have been performed, precisely:

1st. reactivity as a function of time in a 0.1 M phosphate buffer at pH 7.4. A 10 g suspension of polyacrolein in 100 ml of a methyl-guanidine solution (conc. $n = 0.3$ mg%) in a 0.1 M phosphate buffer at pH 7.4 has been kept under continuous stirring. Aliquots of the suspension have been withdrawn after a certain period of time and filtered; 10 ml of filtrate (at this point 10 ml of the original solution of methylguanidine have also been withdrawn) have been loaded separately on Dowex resin 50W × 2 50/100 mesh, Na⁺ form column $\phi$ 1 cm $h = 3$ cm), then the resin has been washed with 100 ml of water, eluted with NaOH 1 N and 25 ml of eluate have been collected.

A colorimetric determination of methylguanidine is performed on the eluates in the following way:

0.5 ml of a 0.025% 1-naphthol, and 5% urea solution is NaOH 1 N are added to 10 ml of eluate; the mixture is stirred and after 1 minute 0.5 ml of sodium hypobromite in 1 N NaOH solution (0.7 ml of bromine dissolved in 1000 ml of NaOH 1 N) are added. After 20 minutes the test is compared at 520 m$\mu$ with a blank free from methylguanidine.

Then the concentration decrements of methylguanidine are calculated from the unreacted amounts of methylguanidine:

| Test | Conc. decrement of methylguanidine |
|---|---|
| after 1 hour | 6% |
| after 2 hours | 9% |
| after 4 hours | 13% |
| after 8 hours | 18% |
| after 24 hours | 24% |

2nd. reactivity after 1 hour at pH 2, then the pH is raised to pH 7.4 and the test is continued as a function of the time.

A 10 g of polyacrolein suspension in 100 ml of methylguanidine solution in HCl 0.01 N (conc. 0.3 mg%) has been kept under continuous stirring. An aliquot of the suspension has been withdrawn after 1 hour and has been filtered while the pH of the remaining suspension has been raised to 7.4 with NaOH 2N and the suspension has been buffered at pH 7.4 with a solid mixture of $NaH_2PO_4$ —$Na_2HPO_4$; the stirring is continued and after a certain period of time aliquots of the suspension have been withdrawn and filtered. 10 ml of filtrate (the filtrate from pH 2 has been raised to pH 7.4 with NaOH 2 N and a $NaH_2PO_4$ — $Na_2HPO_4$ mixture) have been loaded on Dowex resin 50 W × 2 50/100 mesh $Na^+$ form, then the resin has been washed with 100 ml of water, eluted with NaOH 1 N and 25 ml of eleuate have been collected.

The colorimetric determination test as described in the 1st test has been performed on the eluate using a comparison blank test made with the original methylguanidine solution.

The following results have been obtained

| Test | Methylguanidine conc. decrement |
|---|---|
| after 1 hour at pH 2 is raised to pH 7.4 and: | 40% |
| after 1 hour | 44% |
| after 2 hours | 45% |
| after 6 hours | 46% |

It should be observed that the percent decrement (D%) of methylguanidine at the 24th hour is 24%, while at pH = 2, 40% is reached after 1 hour. The last test shows that pH variations do not change the polyacrolein activity on methylguanidine, ensuring thus the possibility of its administration in vivo. In fact in the stomach-intestinal tract there are the same pH variations reproduced in the experiment described.

EXAMPLE V — (Reactivity on creatinine)

Reactivity tests of polyacrolein with creatinine have been performed at pH 2 (HCl 0.01 N) and at pH 7.4 (phosphate buffer 0.1 M) using a 20 mg% creatinine solution.

A 2 g polyacrolein as such suspension in 25 ml of a 20 mg% solution of creatinine has been maintained under continuous stirring. Aliquots of the suspension have been withdrawn after a certain period of time and filtered. The unreacted creatinine has been spectrophotometrically determined in the filtrate after appropriate dilution with a 0.1 M phosphate buffer solution at pH 7.4. A blank free from creatinine has been treated in the same way and used in a comparison test.

Then the concentration decrements of creatinine have been calculated:

1) Test at pH 2.00:

| time | conc. decrement % |
|---|---|
| 30 min. | 1.5% |
| 60 min. | 2 % |
| 90 min. | 3 % |

2) Test at pH 7.4:

| time | conc. decrement % |
|---|---|
| 1 h | 5% |
| 2 h | 5.5% |
| 3 h | 6% |
| 4 h | 6.5% |
| 8 h | 8% |
| 24 h | 9.5% |

It should be particularly emphasized that the results indicated in all the preceding examples have been obtained on a series of identical experiments, repeated on 10 samples of polyacrolein and that no substantial variations between one and the other test on the same series could be observed when the polyacrolein sample was varied. Analogous results on the polyacrolein reactivity with the "uremic toxins" are also obtained in vitro on physiologic liquid such as saliva, gastric juice, intestinal juice, urine etc. of uremic patients. On the present invention product and in particular on polyacrolein, test of acute toxicity have been performed both on the rat and on the mouse and the results show that polyacrolein may be administered per os up to 9 g/kg of body weight without occurrence of mortality. Tests on subacute toxicity of polyacrolein have been performed on the rat, feeding 4 fractioned doses ranging from 1 to 4 g/kg of polyacrolein per os, to 70 rats divided in 7 groups of 10 animals per group, each group being treated as follows:

| Group 1 polyacrolein | 1 g/kg os | in 4 fractioned doses |
| Group 2 polyacrolein | 2 g/kg os | '' |
| Group 3 polyacrolein | 4 g/kg os | '' |
| Group 4 polyacrolein | 1 g/kg os + sorbitol 1 g/kg os in 4 fractioned doses | |
| Group 5 polyacrolein | 2 g/kg os + sorbitol 1 g/kg os in 4 fractioned doses | |
| Group 6 polyacrolein | 4 g/kg os + sorbitol 1 g/kg os in 4 fractioned doses | |
| Group 7 controls | gum arabic | |

The treatment lasted 15 days.

The animals have been examined every day and no significant weight variations have been observed.

Every day all the feces in each cage have been collected and weighed (in every cage there were 5 rats of the same sex, treated with the same dose) and the percent of humidity of the pellets has been determined drying them in the oven for 24 h at 110°C.

The weight and the humidity trend of the excreted feces has been examined and no variation has been evidenced among the treated rats and the controls as far as the lapse of polyacrolein in the gastro-intestinal tract was concerned.

Urines have been collected and analyzed. No pathological values have been observed in any case.

An accurate autopsy was performed after the animal death and the results of the examination are presented hereinafter:

Stomach: moderate dilation with integral walls — absence of hyperemia
Spleen: no sign of alteration
Kidney: no sign of alteration
Intestine: no sign of alteration in all its tract.

In addition to these data of the macroscopic examination, the following organs have been examined and weighed: liver, kidney, spleen, hypophysis, brain, heart, gonads, seminal vesicles and prostate in the male, suprarenals in the female. No statistically significant data in comparison with the controls have been evidenced concerning macroscopic and weight variations.

The biochemical parameters investigated were: glycemia, azotemia, GPT-ase, and bilirubinemia.

Only GPT-ase, showed a statistically significant variation is comparison with the controls, but being the values of the treated rats lower than those of the controls, this variation does not represent a pathological indication.

Another statistically significant variation was the bilirubinemia in the rats treated with polyacrolein and polyacrolein + sorbitol, whose values of the treated rats are higher than those of the controls.

The liver of the animals under treatment (high doses and controls) has been subjected to histological examination after formalin fixation and paraffin inclusion. Microtomical sections of 10 - 12 $\mu$ did not indicate any content of positive-aldehydic substances.

CONCLUSIONS

From the data obtained it may be concluded that in the experimental conditions which have been described, rats treated for 15 days with different doses of polyacrolein or polyacrolein + sorbitol per os did not show neither any alteration in the transit up to a dose of 4 g/kg per os, nor with this treatment have been evidenced other pathological alterations with respect to the biochemical constants and other investigated parameters.

Furthermore, activity tests in vivo of the polyacrolein of the present invention have been performed on rats to whom this polyaldehyde has been administered per os. To this end the animals have been subsequently poisoned with ammonium chloride in increasing amounts ranging from 1585 to 1995 mg/kg per os on 180 rats, using 120 rats as a control. The results are reported in the following table:

| Log. Dose mg/kg/os NH$_4$Cl | Controls | Polyacrolein 500 mg/kg/os | 1000 mg/kg/os |
|---|---|---|---|
| 3.20 | 16/40 | 5/30 | 6/30 |
| Mortality | 40% | 17% | 20% |
| 3.25 | 25/40 | 10/30 | 9/30 |
| Mortality | 62% | 33% | 30% |
| 3.30 | 32/40 | 11/30 | 11/30 |
| Mortality | 80% | 37% | 37% |

It should be observed that the administration of polyacrolein per os reduced the lethality due to NH$_4$Cl administrated to the rat per os.

Finally the results of polyacrolein reactivity tests on human plasma in vitro are reported.

300 g of recrystallized urea have been added to 100 ml of human plasma containing 200 I.U. of penicillin and 100 $\gamma$ of streptomycin/ml.

A Wishing tube 32/32 for dyalisis, containing 2 g of polyacrolein suspended in 10 ml of plasma, having the same urea concentration has been introduced into the plasma thus treated. The system has been kept for 72 hours at +4°C under continuous magnetic stirring. Samples have been taken at time 0 and after 72 hours. Urea concentration (hypobromidric azotemia) on two samples, $R_3$ (time 0) and $R_2$ (after 72 hours) has been determined by a dell'Aire microureometer and found to be $R_3$ — g 6.30%
$R_2$ — g 5.20%.

An analysis of the two samples with the Beckman aminoacidsanalyzer model 120 indicated a very great reactivity with urea and a negligible reactivity with the aminoacids; a result easy to understand considering that the reaction between polyacrolein and nitrogenous substrate is strongly affected by substrata concentration. Therefore a specific reactivity may result with one of them if this one is in great excess with respect to the other substrata. Clinical Use.

The clinical use of polyaldehydes obtained according to the process of the present invention has been studied in patients affected by renal insufficiency.

By daily administration per os of 30/70 g of polyacrolein in fractioned doses, it has been possible to reduce the uremic toxins concentration. In fact they are linked with the polyaldehyde in transit through the gastro-intestinal tract and then they are eliminated with the feces.

In addition it has been observed an increase in the fecal volume. This fact is in agreement with the swelling of polyacrolein already observed in vitro. This phenomenon is a matter of remarkable interest insofar as water elimination in uremic patients improves their general conditions.

The daily administration of the same dose of polyaldehyde to patients with extreme renal insufficiency, and subjected to maintenance therapy by means of the artificial kidney or peritoneal dialysis permits to extend the interdialysis interval. Clinical cases history.

Data obtained in the course of clinical experiments on 5 patients affected by serious renal insufficiency, in which polyacrolein according to the present invention has been used are herein reported.

The daily administration of 50 g of polyacrolein per os to 3 patients affected by uremia allowed, in particular, to reduce the methylguanidina creatinine and urea concentration.

In fact said substances are linked by polyacrolein along the whole gastro-intestinal tract and are eliminated with the feces as shown by the decrease of their concentration in the blood and in the urine after polyacrolein administration.

The daily administration of the same dose of polyacrolein to 2 patients affected by extreme renal insufficiency and subjected to maintenance therapy with the artificial kidney, allowed to double the interdialytic interval.

Finally the uses of polyaldehydes as deodorants and depuration agents should be recognized. It is known that many volatile substances which are the cause of bad odor possess the chemical requirements for reacting with said polyaldehydes, being thus retained and eliminated. Therefore, the polymers described can be used for the preparation of deodorant tablets, for example tablets having the following composition:

polyacrolein—800 mg
sugar — 930 mg
magnesium stearate—40 mg
essence of orange in powder form—100 mg
essence of lemon in powder form—30 mg.

Another use of said polyaldehydes is to provide a means for the depuration of industrial waste water, in particular for the elimination of pollutants agents from them and specifically for the elimination of phenols, ammonia and cyanides. The resins of the present invention may find an application also for the depuration of gas, in particular for the removal of nitrogen and sulfur which takes place in appreciable and convenient amounts.

The present invention has been described with particular reference to preferred embodiments thereof, but it is intended that modifications or variations may be introduced without infringing the protection limits of the present industrial patent.

Having thus described the present invention, what is claimed is:

1. Process for the preparation of polyaldehydes by polymerization with a redox system, of bifunctional monomers having the formula:

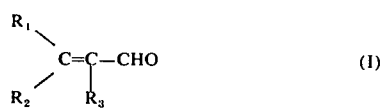

(I)

wherein $R_1 = R_2 = H$ and $R_3$ is —H, —$CH_3$, —$C_2H_5$, —$C_3H_7$, —$C_6H_{13}$, or —$C_6H_5$ or $R_1 = R_3 = H$ and $R_2$ is —$CH_3$, —$C_6H_5$, or —$CH_3$ —CH=CH, comprising performing the polymerization under stirring, in absence of light and in oxygen free nitrogen atmosphere, for a period of 2-20 hours, at a temperature ranging from 0° to 40°C, using degassed and double distilled water as a solvent and $K_2S_2O_8/AgNO_3$ as a redox system, adding degassed and double distilled water to the polymerized mass, collecting the polyaldehyde by filtration and centrifugation, washing several times with water, then with 0.1 N $HNO_3$, again washing with water and finally with acetone and drying the product.

2. Process according to claim 1, characterized by the fact that said bifunctional monomers of formula (I) are destabilized, in absence of light, and under oxygen free nitrogen, by distillation in a Vigreux column and collected in these conditions in the reaction container.

3. Process according to claim 2, characterized by the fact that the oxygen content in said nitrogen is less than $10^{-4}$ ppm.

4. Process according to claim 1, characterized by the fact that an amount (1 part) of said bifunctional monomer ranging from 200 to 5000 cc is collected by direct redistillation into the reaction container.

5. Process according to claim 4, characterized by the fact that 5 parts of a 5–100 mM potassium persulfate solution in degassed and double distilled water are added to one part of said monomer redistilled in the reaction container, subsequently, after its complete dissolution, 0.6 parts of a 5–100 mM $AgNO_3$ solution are added, dropwise in 10 minutes and the reaction system is maintained at 0°– 40°C under oxygen free nitrogen for 2 hours, water (5 parts) is added, and the polymer is collected by centrifugation or filtration, washed 5 times with 3 parts of water, with $HNO_3$ 0.1 N, again with water until neutrality, finally three times with 1 part of acetone and dried in the oven at 30°C.

6. Process according to claim 1, characterized by the fact that said bifunctional monomer is acrolein, 4.75 grams of $K_2S_2O_8$ and 2.96 grams of $AgNO_3$ per 100 cc of said acrolein being used as a redox system at a temperature of 28°– 32°C.

7. Polyaldehydes obtained according to the process of claim 1, characterized by the fact that their molecular weight is ranging from 5,000 to 1,000,000.

8. Polyaldehydes according to claim 7, characterized by the fact that said molecular weight is 20,000 – 30,000.

* * * * *